(12) United States Patent
Karabatsos (10) Patent No.: US 8,757,125 B2
(45) Date of Patent: Jun. 24, 2014

(54) ENGINE CRANKSHAFT AND METHOD OF USE

(71) Applicant: Chris Karabatsos, Kingston, NY (US)

(72) Inventor: Chris Karabatsos, Kingston, NY (US)

(*) Notice: Subject to any disclaimer, the term of this patent is extended or adjusted under 35 U.S.C. 154(b) by 0 days.

(21) Appl. No.: 13/754,929

(22) Filed: Jan. 31, 2013

(65) Prior Publication Data
US 2013/0146019 A1 Jun. 13, 2013

Related U.S. Application Data

(63) Continuation-in-part of application No. 13/112,939, filed on May 20, 2011, now Pat. No. 8,381,699.

(60) Provisional application No. 61/449,555, filed on Mar. 4, 2011.

(51) Int. Cl.
F02B 75/32 (2006.01)

(52) U.S. Cl.
USPC ............................ 123/197.1; 123/197.3

(58) Field of Classification Search
USPC .................... 123/197.1, 197.3, 197.4
See application file for complete search history.

(56) References Cited

U.S. PATENT DOCUMENTS

| | | | | |
|---|---|---|---|---|
| 1,886,455 A | * | 11/1932 | Thonger | 123/195 A |
| 2,426,876 A | * | 9/1947 | Hasbrouck et al. | 123/54.2 |
| 5,189,994 A | * | 3/1993 | Gindentuller | 123/54.2 |
| 6,202,622 B1 | * | 3/2001 | Raquiza, Jr. | 123/197.4 |
| 6,612,271 B2 | * | 9/2003 | Sano | 123/41.51 |
| 6,612,281 B1 | * | 9/2003 | Martin | 123/197.4 |
| 6,615,773 B2 | * | 9/2003 | Moteki et al. | 123/48 B |
| 7,121,251 B2 | * | 10/2006 | Moteki et al. | 123/197.1 |
| 2009/0241894 A1 | * | 10/2009 | Pelrine et al. | 123/197.4 |
| 2011/0192371 A1 | * | 8/2011 | Satou | 123/197.4 |

* cited by examiner

Primary Examiner — Noah Kamen
Assistant Examiner — Long T Tran
(74) Attorney, Agent, or Firm — Law Offices of Michael L. Wise, LLC (57) ABSTRACT

An engine comprises one or more cylinders, each cylinder comprising a piston, a connecting rod, a crank shaft, and a crankpin, wherein the crankpin further comprises a main crankpin and a crankpin extension, wherein the connecting rod is affixed at one end to the piston and at another end to a first end of the crankpin extension, wherein a second end of the crankpin extension is affixed to a first end of the main crankpin, and wherein a second end of the main crankpin is affixed to the crankshaft.

7 Claims, 12 Drawing Sheets

ENGINE CRANKSHAFT AND METHOD OF USE

FIELD OF THE INVENTION

The field of the system described herein the Crankshaft design of an internal combustion engine which will provide a noticeable improvement in power generation with a given quantity of fuel power density. Many devices that convert linear to rotational energy will benefit with the application of the system described herein.

DESCRIPTION RELATIVE TO THE RELEVANT ART

For purposes of demonstration, the four cylinder internal fuel combustion engine will be used without restriction of applications to engines with fewer or more than four.

For better description of the relevant art, copies of entries contained in encyclopedias and other authoritative sources are contained herein and appear within quotation marks.

Internal Combustion Engine

The present system is an improvement to the well-known four-stroke, or four-cycle internal combustion engine. The engine includes a cylindrical piston contained within a cylindrical cylinder. Fuel is injected above the piston, and is caused to burn or explode, driving the piston down. Means are provided to convert the linear travel of the piston to circular motion.

A physical model for the operation of this engine includes four distinct cycles in the repeated operation of the engine. The cycle begins at Top Dead Center (TDC), when the piston is farthest away from the axis of the crankshaft. It is at TDC where the piston is closest to the top of the cylinder. The first stroke ends when the piston is driven down to a point farthest away from the top of the cylinder, a point called the Bottom Dead Center (BDC). Each stroke is defined as a travel between the TDC and the BDC.

The linear travel of the piston is converted to circular travel by connecting the bottom of the piston to a crankshaft by a linkage containing a connecting rod, connected at one end to the bottom of the piston, and at the other end to one end of a crankshaft pin or throw. The other end of the crankshaft pin is connected to the crankshaft, causing the crankshaft to turn as the piston ascends or descends.

The four strokes are defined as the Intake, Compression, Power, and Exhaust Strokes.

Figure 3A:
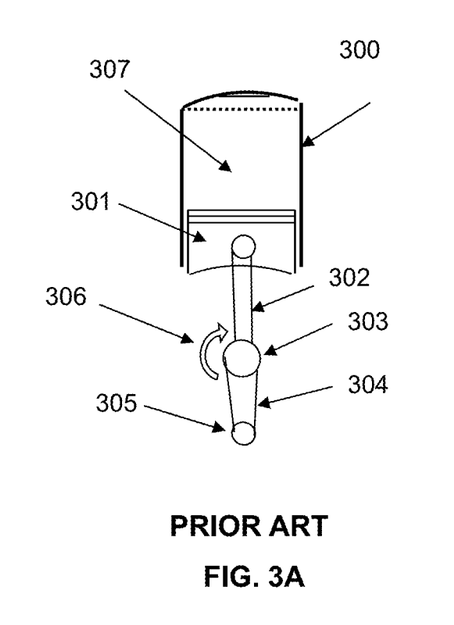
FIG. 3A depicts a typical prior art movement of a piston for compression of the gas-air mixture, showing the location of the piston at the point of BDC (Bottom Dead Center)
Figure 3B:
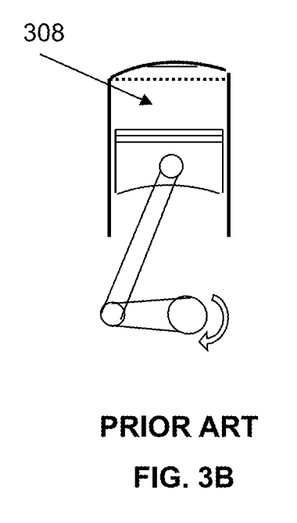
FIG. 3B depicts a typical relevant art movement of a piston for compression of the gas-air mixture, showing the location of the piston at the point of 90 degrees before TDC (Top Dead Center).
Figure 3C:
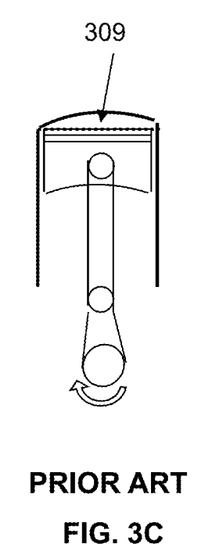
FIG. 3C depicts a typical prior art movement of a piston for compression of the gas-air mixture. It shows the location of the piston at the point of TDC (Top Dead Center).

On the intake or induction stroke the piston descends from the top of the cylinder, as shown in FIG. 3C, to the bottom of the cylinder, as shown in FIG. 3A, drawing a mixture of fuel and air into the cylinder through an intake port. An intake valve opens at the beginning of the intake stroke, and closes at the bottom of this stroke.

The piston then is caused to rise, compressing the fuel-air mixture in the cylinder, as shown in FIG. 3B. This phase of the operation is called the Compression Stroke.

After the piston reaches or approaches the top of its travel the fuel-air mixture is cause to ignite, causing an explosion which drives the piston back down toward the bottom. This stroke is called the Power Stroke. As the connecting rod is forced down, it causes the crankshaft to turn, producing a torque on the crankshaft. The amount of torque at any point in time is a function of the force exerted through the connecting rod, the angle between the longitudinal axis of the connecting rod and the longitudinal axis of the crankpin, and the angle between the longitudinal axis of the connecting rod and the centerline of the piston, passing from the center of the piston and the cross-section center of the crankshaft.

After the piston reaches BDC, it is caused to rise again, as the exhaust valve opens. The spent fuel-air mixture is forced out of the cylinder through the exhaust valve. This Exhaust Stroke completes the four cycles of the engine, which then repeat themselves as long as the engine continues to run.

This four-cycle engine contains a number of inefficiencies as presently implemented. The forces created are not always applied in the direction required to maximize the torque produced at any instant in time. For instance, at the beginning of the power stroke the piston is driven directly down toward the crankshaft, which does not cause the crankshaft to rotate, but rather attempts to push the crankshaft toward the bottom of the engine.

The crankshaft is constructed and supported so that it will not translate in this direction. Thus, the energy produced at this part of the power stroke is converted into heat, rather than motion.

Relevant Art Physics

The following table shows the variation in torque as a function of crankshaft angle during the Power Stroke of a typical four-cycle engine (s$^{ee}$ C. Johnson at http://mb-soft.com/public2/engine05.txt).

This table shows the relationships between crank angle, instantaneous compression ratio, instant pressure, instant force and instant torque for a number of different crankshaft angles.

The data was determined for a 350 HP V-8 cylinder, having a 9:1 compression ratio. It is included to demonstrate how torque varies with crankshaft angle, and how the various components creating the torque contribute to the total. In particular, the table demonstrates that the maximum torque is created when the instance force resulting from the ignition of the air-fuel mixture has dissipated to a degree.

| ENGINE ANALYSIS- RELEVANT ART | | | | |
|---|---|---|---|---|
| crank angle | instant. comp ratio | instant. pressure | instant. force | instant. torque |
| 0 | 9.000 | 500.0 | 6283.1 | 0.0 |
| 1 | 8.994 | 499.7 | 6279.2 | 15.9 |
| 2 | 8.978 | 498.8 | 6267.8 | 31.7 |
| 3 | 8.951 | 497.3 | 6248.8 | 47.4 |
| 4 | 8.913 | 495.2 | 6222.4 | 62.9 |
| 5 | 8.865 | 492.5 | 6188.9 | 78.2 |
| 6 | 8.807 | 489.3 | 6148.3 | 93.2 |
| 7 | 8.739 | 485.5 | 6101.1 | 107.8 |
| 8 | 8.663 | 481.3 | 6047.6 | 122.0 |
| 9 | 8.577 | 476.5 | 5988.2 | 135.8 |
| 10 | 8.484 | 471.3 | 5923.1 | 149.1 |
| 11 | 8.384 | 465.8 | 5852.9 | 161.9 |
| 12 | 8.276 | 459.8 | 5778.0 | 174.2 |
| 13 | 8.163 | 453.5 | 5698.8 | 185.9 |
| 14 | 8.044 | 446.9 | 5615.8 | 197.0 |
| 15 | 7.920 | 440.0 | 5529.4 | 207.5 |
| 16 | 7.792 | 432.9 | 5440.1 | 217.4 |
| 17 | 7.661 | 425.6 | 5348.3 | 226.7 |
| 18 | 7.526 | 418.1 | 5254.4 | 235.4 |
| 19 | 7.389 | 410.5 | 5158.8 | 243.5 |
| 20 | 7.251 | 402.8 | 5062.0 | 251.0 |
| 21 | 7.111 | 395.0 | 4964.2 | 258.0 |
| 22 | 6.970 | 387.2 | 4865.8 | 264.3 |
| 23 | 6.829 | 379.4 | 4767.2 | 270.1 |
| 24 | 6.687 | 371.5 | 4668.6 | 275.3 |
| 25 | 6.546 | 363.7 | 4570.3 | 280.1 |
| 26 | 6.406 | 355.9 | 4472.5 | 284.3 |

-continued

ENGINE ANALYSIS- RELEVANT ART

| crank angle | instant. comp ratio | instant. pressure | instant. force | instant. torque |
|---|---|---|---|---|
| 27 | 6.267 | 348.2 | 4375.5 | 288.0 |
| 28 | 6.130 | 340.5 | 4279.4 | 291.3 |
| 29 | 5.994 | 333.0 | 4184.5 | 294.2 |
| 30 | 5.860 | 325.5 | 4090.8 | 296.6 |
| 31 | 5.728 | 318.2 | 3998.6 | 298.6 |
| 32 | 5.598 | 311.0 | 3907.9 | 300.3 |
| 33 | 5.470 | 303.9 | 3818.8 | 301.6 |
| 34 | 5.345 | 296.9 | 3731.4 | 302.6 |
| 35 | 5.222 | 290.1 | 3645.8 | 303.2 |
| 36 | 5.102 | 283.5 | 3562.0 | 303.6 |
| 37 | 4.985 | 276.9 | 3480.1 | 303.7 |
| 38 | 4.870 | 270.6 | 3400.0 | 303.5 |
| 39 | 4.758 | 264.3 | 3321.9 | 303.1 |
| 40 | 4.649 | 258.3 | 3245.7 | 302.5 |
| 41 | 4.543 | 252.4 | 3171.4 | 301.7 |
| 42 | 4.439 | 246.6 | 3099.1 | 300.7 |
| 43 | 4.338 | 241.0 | 3028.6 | 299.5 |
| 44 | 4.240 | 235.6 | 2960.1 | 298.2 |
| 45 | 4.144 | 230.2 | 2893.4 | 296.7 |
| 46 | 4.052 | 225.1 | 2828.5 | 295.0 |
| 47 | 3.961 | 220.1 | 2765.5 | 293.3 |
| 48 | 3.873 | 215.2 | 2704.2 | 291.4 |
| 49 | 3.788 | 210.5 | 2644.7 | 289.4 |
| 50 | 3.705 | 205.9 | 2586.9 | 287.3 |
| 51 | 3.625 | 201.4 | 2530.8 | 285.2 |
| 52 | 3.547 | 197.1 | 2476.3 | 282.9 |
| 53 | 3.471 | 192.8 | 2423.4 | 280.6 |
| 54 | 3.398 | 188.8 | 2372.0 | 278.3 |
| 55 | 3.326 | 184.8 | 2322.2 | 275.8 |
| 56 | 3.257 | 180.9 | 2273.8 | 273.3 |
| 57 | 3.190 | 177.2 | 2226.9 | 270.8 |
| 58 | 3.125 | 173.6 | 2181.4 | 268.2 |
| 59 | 3.061 | 170.1 | 2137.2 | 265.6 |
| 60 | 3.000 | 166.7 | 2094.4 | 263.0 |
| 61 | 2.940 | 163.4 | 2052.8 | 260.3 |
| 62 | 2.883 | 160.1 | 2012.5 | 257.7 |
| 63 | 2.827 | 157.0 | 1973.3 | 254.9 |
| 64 | 2.772 | 154.0 | 1935.4 | 252.2 |
| 65 | 2.719 | 151.1 | 1898.5 | 249.5 |
| 66 | 2.668 | 148.2 | 1862.8 | 246.7 |
| 67 | 2.618 | 145.5 | 1828.1 | 244.0 |
| 68 | 2.570 | 142.8 | 1794.4 | 241.2 |
| 69 | 2.523 | 140.2 | 1761.7 | 238.5 |
| 70 | 2.478 | 137.7 | 1730.0 | 235.7 |
| 71 | 2.434 | 135.2 | 1699.2 | 233.0 |
| 72 | 2.391 | 132.8 | 1669.3 | 230.2 |
| 73 | 2.350 | 130.5 | 1640.3 | 227.4 |
| 74 | 2.309 | 128.3 | 1612.1 | 224.7 |
| 75 | 2.270 | 126.1 | 1584.8 | 222.0 |
| 76 | 2.232 | 124.0 | 1558.2 | 219.2 |
| 77 | 2.195 | 121.9 | 1532.4 | 216.5 |
| 78 | 2.159 | 120.0 | 1507.3 | 213.8 |
| 79 | 2.124 | 118.0 | 1483.0 | 211.1 |
| 80 | 2.090 | 116.1 | 1459.4 | 208.4 |
| 81 | 2.057 | 114.3 | 1436.4 | 205.7 |
| 82 | 2.026 | 112.5 | 1414.1 | 203.0 |
| 83 | 1.994 | 110.8 | 1392.4 | 200.4 |
| 84 | 1.964 | 109.1 | 1371.3 | 197.8 |
| 85 | 1.935 | 107.5 | 1350.8 | 195.1 |
| 86 | 1.906 | 105.9 | 1330.9 | 192.5 |
| 87 | 1.879 | 104.4 | 1311.5 | 189.9 |
| 88 | 1.852 | 102.9 | 1292.7 | 187.3 |
| 89 | 1.825 | 101.4 | 1274.4 | 184.8 |
| 90 | 1.800 | 100.0 | 1256.6 | 182.2 |

From this data it may be seen that the maximum force generated by the explosion of the fuel takes place at the top of the stroke, where the connecting rod is vertical, and all the force is directed downwards. As a result the no torque is generated in this position, since the torque is a function of the cosine of the angle between the vertical and the connecting rod (the "moment arm") times the force generated by the explosion in the direction perpendicular to the axis of the crankpin.

The cosine of that angle is maximum when the angle in 90 degrees. But by that time the force of the explosion is reduced to 1256.6, compared to 6283.1 at TDC, or 19 percent of its maximum value.

So, paradoxically the torque is maximized when the crankpin is between 35 and 39 degrees, and by the time it reaches 90 degrees it is reduced to 19 percent of its maximum value. For the balance of the 180 degrees of the power stroke the torque rapidly declines toward zero.

The present configuration of the connection between the piston and the crankshaft makes a more efficient use of the force generated by the explosion of the fuel by changing the geometry of this linkage making the maximum force of the explosion take place when the moment arm between the force causing the crankshaft to turn is at a higher value, which is to say, higher than zero. This is done by introducing another linkage between the crankpin and the connecting rod. This other linkage is called the "crankpin extension". In the present system, the crankpin extension is permanently and rigidly affixed to the crankpin at an angle of about 90 degrees.

Terminology Used in the Descriptions

The term "crankshaft" or "crank" is used to refer to the part of the engine whose motion is rotational.

The term "crank throw" or "crankpin" is used to describe that offset portions of the crank. The crankpin axis is parallel to the axis of rotation. It is used to attach split bearings of connecting rods.

The term "TDC" (Top Dead Center) is used to describe the upper most position of piston travel when the connecting piston rod and the associated crankpin lie on the same plane.

The term "BDC" (Bottom Dead Center) is used to describe the lowest most position of piston travel when the connecting piston rod and the associated crankpin lie on the same plane.

The term "Engine Block" or "Block" refers to the solid engine body.

The term "bearing" is used to describe the split bearing that is used to attach connecting rods to Master crankpins and to Load crankpins.

The term "flywheel" is used to describe any attachment to the crankshaft to provide means for storing rotational energy. The stored rotational energy, due to inertia, is used to smooth out the power delivery over each rotation of the crank.

The term "main crankpin" is used to describe a first part of a jointed crankpin used in the main embodiment of the current system.

The term "crank extension" is used to describe the connecting member which connects between the main crankpin and the connecting rod in the present system.

It is the purpose of system described herein to provide means and methods by which the power density of a given fuel and air mixture within a cylinder will provide power due to combustion that will be utilized more efficiently by use of a new crankshaft design.

The example described herein uses a four-cylinder four-stroke engine without diminishing the object of the system described herein if applied to other configurations of internal combustion engines and to mechanisms that convert rotational power to some other form such as electrical and or kinetic.

BRIEF DESCRIPTION OF THE DRAWINGS

These, and further features of the system described herein, may be better understood with reference to the accompanying specification and drawings depicting the embodiments described herein, in which.

SUMMARY OF THE PRESENT EMBODIMENT

It is the purpose of system described herein to provide means and methods by which the power density of a given fuel and air mixture within a cylinder will be used more effectively during the combustion cycle.

The example described herein uses a four-cylinder four-stroke Engine without diminishing the object of the system described herein if applied to other configurations of internal combustion engines and to mechanisms that convert rotational power to some other form such as electrical and or kinetic.

The system described herein does not alter combustion of a fuel, but rather it utilizes a crankshaft designed to produce more tangential force at the end of the crankpins using the highest combustion pressures applied at larger angles of the rotating crankpins than the conventional crankshaft. Angles of rotating crankpins are measured in relation to the TDC plane and in the direction of rotation.

The most noticeable difference between the present embodiment and the prior art four-cycle engine is that the new system described herein does not use the conventional crankshaft pin of the typical Otto engine. Instead, the conventional crankshaft is replaced with present embodiment redesigned crankshaft and crankshaft pin.

The descriptions of the system, described herein, to achieve higher production of torque and power is explained in greater detail in the description of the system.

Due to the arrangement of the conventional crankpins of the Otto Engine, the high combustion force created within the cylinder when the piston travels to the Top Dead Center (TDC), is not producing large tangential force at the crankpin axis. The highest force of the combustion is trying to push the crankpin through the bottom of the engine.

As the piston starts to descend, the angle of the crankpin in relation to the TDC reference line starts to increase. As the angle increases, the tangential force at the axis of the crankpin starts to increase.

With the descent of the piston, the pressure on top of the piston starts decreasing. By the time the angle of the crankpin to the connecting rod reaches 90 degrees for best torque generation, the pressure from the gases has decreased and the production of the torque is on the decrease. This will become evident by examination of the Volume/Pressure graph.

First Embodiment

In the first embodiment of the system, the crankpin shape is redesigned. The conventional crankpin has its sides and the axis on the same plane. The redesigned crankpin has the two supporting sides to the crankshaft axis on the same plane and they extend from the main crankshaft at some distance.

At the end of the supporting sides, there are supporting sides that lead to the axis of the crankpin and they belong to a different plane. There is an angle formed between each set of the supporting sides that lead to the axis of the crankpin, as discussed infra.

In a second aspect of the system, the length of each section of each supporting side of the crankpin axis is designed for maximizing the integral of torque generation over the entire power stroke.

In accordance with another aspect of the system, the redesigned crankpin axis is designed to travel in a circle of radius equal to the one of the conventional crankpin. The radius of the crankpin axis is designed for best performance for each Engine, as measured by calculating the integral of torque over the entire Power Stroke.

In yet another aspect of the system, the distance of the axis of the crankpin to the supporting sides which connect to the crankshaft are designed to produce the desired angle between the supporting crankpin sides to crankshaft and to the TDC line of reference.

In still another aspect of the invention, the traditional crankpin is replaced by a main crankpin and a crankpin extension, rigidly affixed to each other within a plane perpendicular to the crankshaft at an angle between 0 and 90 degrees.

Mechanical Description of the Relevant Art Four Cycle Engine

Many reciprocating internal combustion engines transfer the linear motion of a piston into a rotational motion. This is typically achieved by use of a crankshaft.

Figure 1:
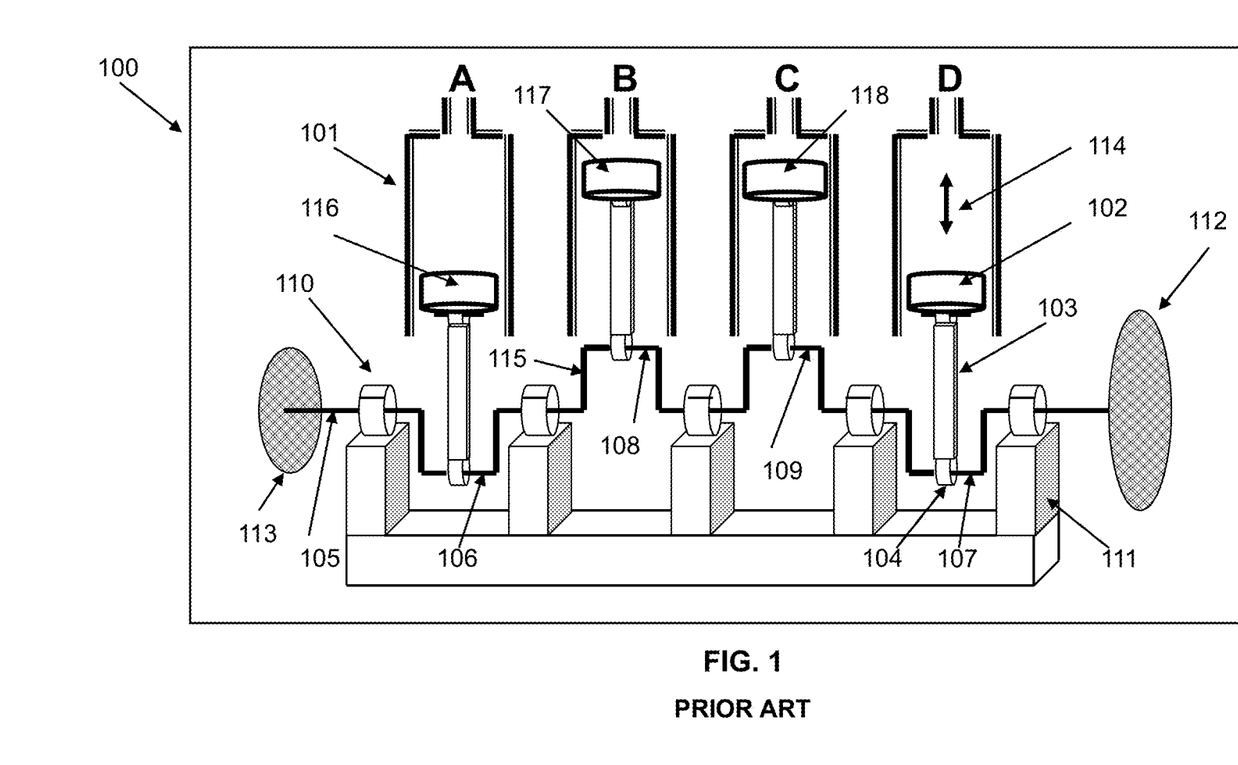
FIG. 1 depicts a typical prior art four cylinder four stroke engine.

Referring to FIG. 1, the main parts of four cycle internal combustion engine 100 in the simplified form are shown. The pistons 116, 117, 118 102, convert a linear reciprocating motion inside the cylinders (A, B, C, D) 101 into rotational motion of the crankshaft 105. To convert the reciprocating motion into rotation, the crankshaft has "crank throws" or "crankpins" 106, 107, 108, 109. The crankpins have bearing surfaces whose axis is offset from that of the crank 105 by a pre-calculated distance 115. Connecting rods 103 from each cylinder attach to these bearing surfaces.

The crankshaft 105 has in-line bearing surfaces which rotate within split bearings 110 which, in turn, are part of the main Engine Block 111. The crankshaft typically connects at the ends to a flywheel 112 which smooths out the rotational motion caused by the changes in torque created by multiple cylinders, and by different values of torque at different portions of the Power Stroke of each cylinder. The flywheel stores rotational energy during moments of high torque production, and reduces the pulsation characteristics of the four-stroke cycle which would otherwise occur. Sometimes a torsional or vibrational damper 113 is connected at the opposite end of the shaft to further reduce the torsion vibrations often present at different points along the length of the crankshaft.

The connecting rods 103 connect the pistons to the crankshaft pins to provide a transfer of energy from the translation of the pistons to the rotation of crankshaft as the piston 102 moves 114 linearly up and down within the cylinder wall 101.

Thus, transferring reciprocating motion to rotary motion is facilitated by connecting the crankshaft crankpins 106, 107, 108, 109, to corresponding pistons by the connecting rods 103.

Still referring to FIG. 1, in the four cycle engine, the crankpins are arranged in pairs. For this example, 106 is paired with 107 and 108 is paired with 109. The crankpins 106 and 107 are 180 degrees opposite to pair 108 and 109; that is to say, they are on opposite sides of the crankshaft. The degree of separation between pairs for engines with more than four cylinders is less than 180 degrees around the crank axis. When one cylinder of the pair is in the compression cycle the other cylinder of the pair is in the exhaust cycle, in order to exhaust the gasses after the combustion cycle.

Relevant Art Crankshaft Design

Figure 4:
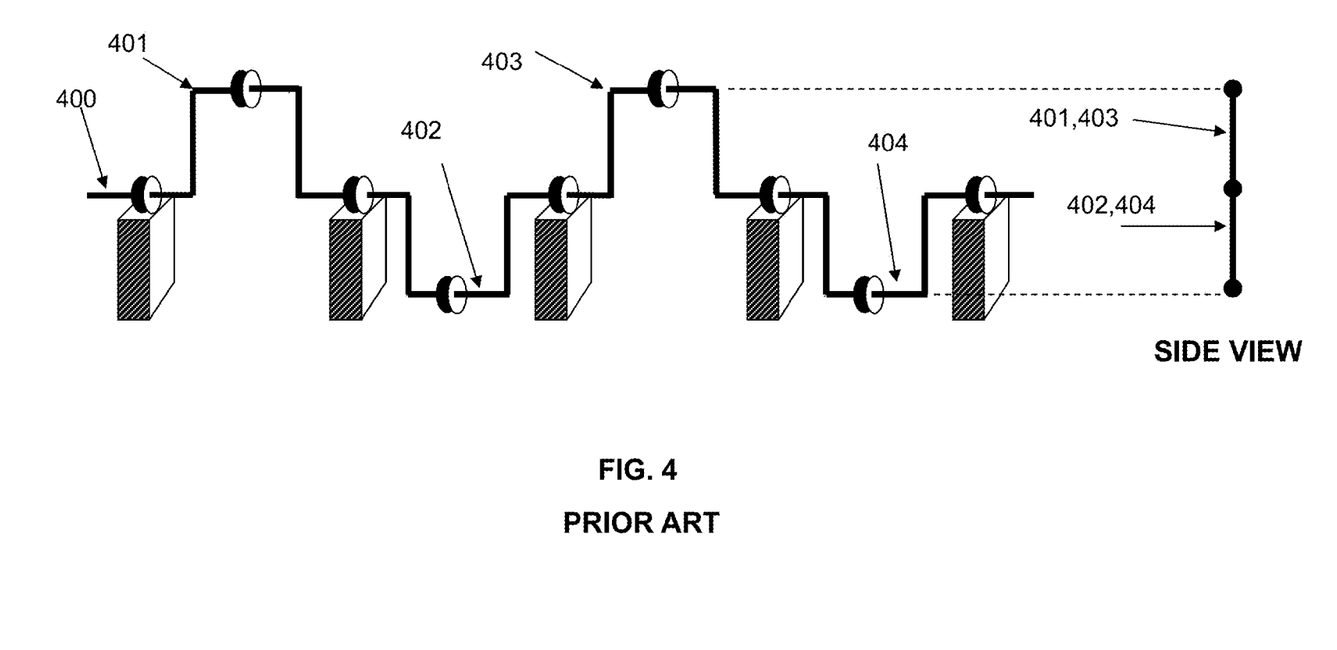
FIG. 4 depicts the crankshaft with the crankpins or throws of the four cylinder engine of relevant art in Front View and Side View of the arrangement.

Referring next to FIG. 4, crankshaft 400 for a four cylinder engine has four crankpins, 401, 402, 403, and 404. All crankpins lie on the same plain. Crankpins 401 and 403 are in the same direction and 402, 404 are in their same direction and 180 degrees opposite to crankpins 401, 403. The side view shown in FIG. 4A further clarifies this geometry.

DESCRIPTION OF THE PRESENT EMBODIMENTS

For description of the system herein, a typical configuration of a four-cylinder engine will be used without exclusion of other configurations of internal combustion engines and other mechanisms that provide rotational energy.

Figure 5:
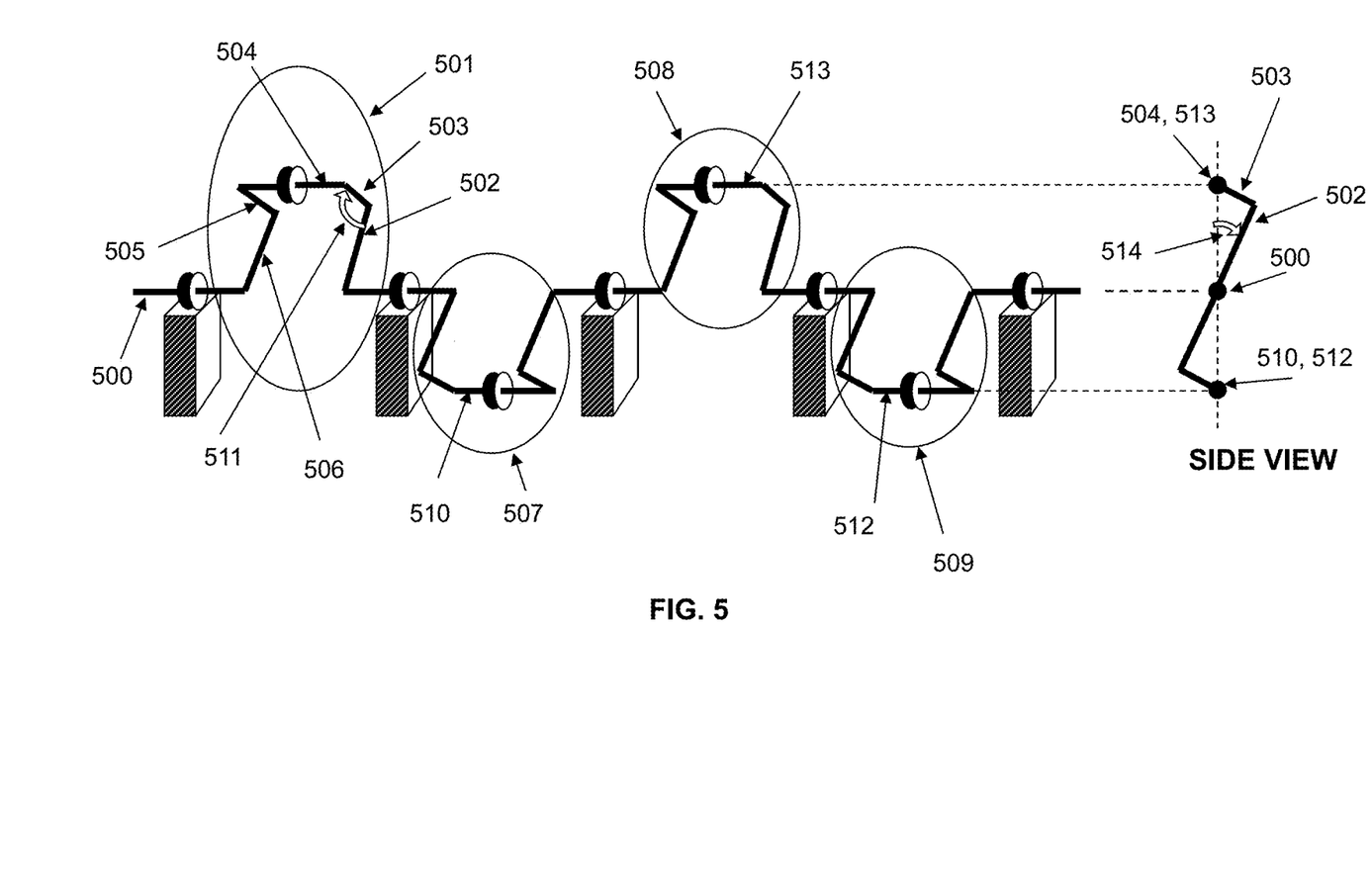
FIG. 5 depicts the crankshaft with the crankpins or throws of a four cylinder engine of present embodiment in Front View and Side View of the arrangement.

Referring to FIG. 5, the crankshaft in accordance with the present embodiment is shown. The crankshaft 500 is for a four cylinder engine. The crankpin 501 description applies to the other crankpins 507, 508, 509.

Crankpin 501 consists of member 502 (the "main crankpin") whose first end connects to the axis of the crankshaft with the second end connecting to a first end of member 503 (the "crankpin extension"). The second end of 503 connects to a first end of the crankpin axis 504. The second end of the crankpin axis 504 connects to the first end of member 505 (the "crankpin extension".) The second end of member 505 connects to the first end of member 506 (the "main crankpin".) The second end of member 506 connects to the crankshaft. The crankshaft is not continuous. It has spaces between the crankshaft connections to the crankpin members 502 and 506 to allow for the piston connecting rod to follow the rotation of the crankpin. Crankpins 501 and 508 have the same orientation of all their respective members and are the same size in all respects.

Crankpins 507 and 509 have the same orientation of all their respective members and are the same size in all respects. They are 180 degrees out of phase in all respective members with crankpins 501 and 508. All crankpin axes have the same length radius of rotation. The angle 511 is the same for both sides of each crankpin and for all crankpins of the crankshaft.

It is chosen for best design and performance. The side view of the present embodiment crankshaft shows the axis of the crankpins 504, 513, 510, 512 and the axis of the crankshaft 500 are at the TDC plane when the gas combustion pressure is at the highest. But, the member 502 forms an angle 514 that allows the combustion force to produce high tangential force at the far end of the crankpin member 502. Angle 514 is designed for best performance.

Figure 5A:
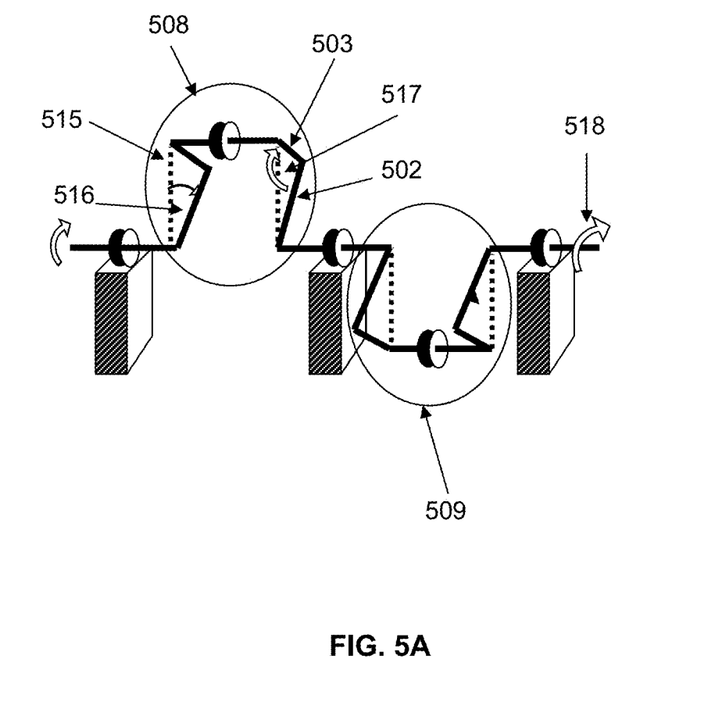
FIG. 5A depicts both crankshafts, relevant art and present embodiment in a superimposed arrangement.

Referring next to FIG. 5A, a section of crankpins 508 and 509 along with a section of the crankshaft 500 is shown. A section of a relevant art crankpin and crankshaft design is superimposed to show the similarities and the differences. The dashed lines 515 show the prior art crankpin design. The solid lines enclosed in 508 and 509 represent the present embodiment crankpin design. The similarities of the crankpins are the crankpin axis and the connections to the crankshaft. The angle 516 shows that the 512 member leads the prior art crankpin member 515 by an angle 516. The size of the angle is determined by design and for the best torque generation. The direction of rotation is shown as 518. The length of member 502 could be equal to the length of 515, shorter or longer, as determined by design. The angle 516 will be determined by the length chosen for member 503.

Figure 6:
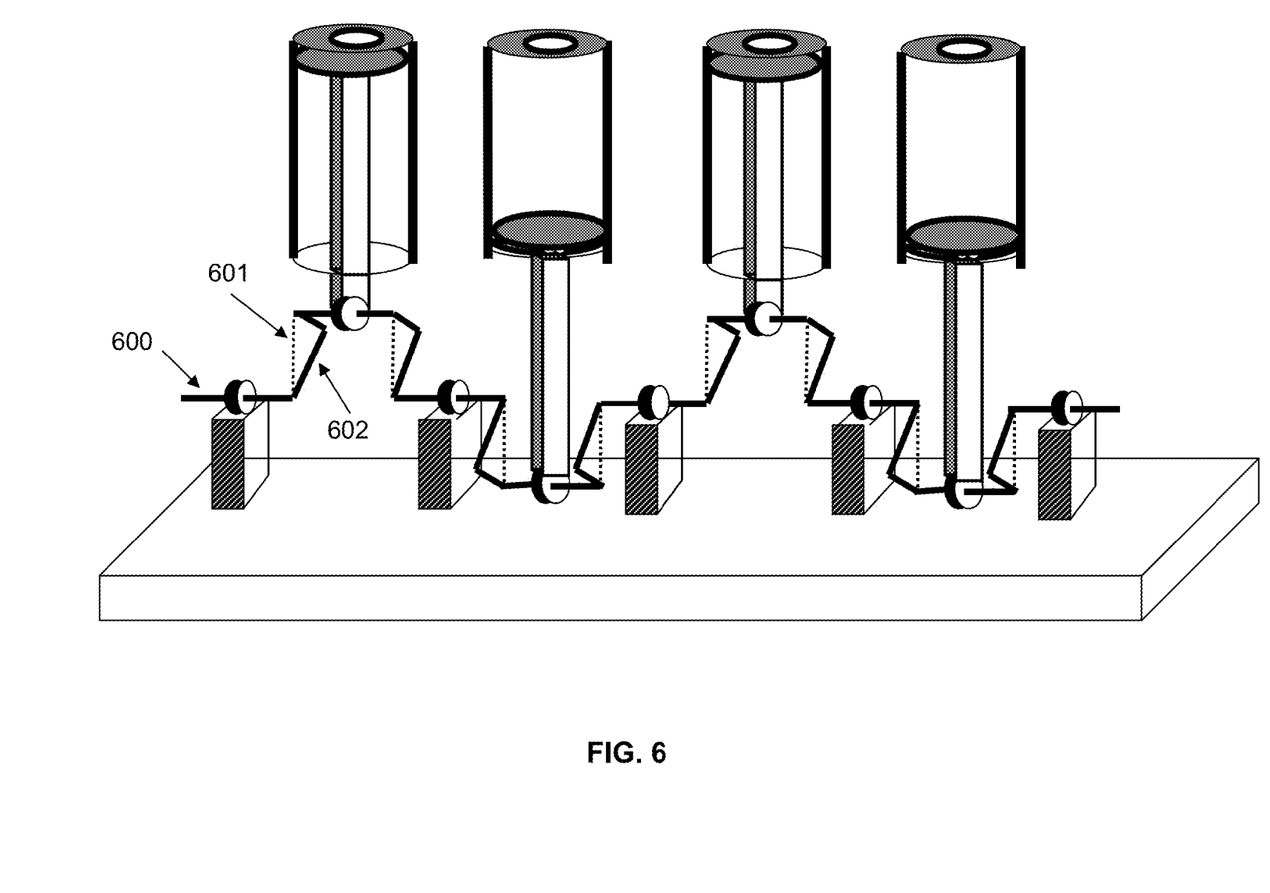
FIG. 6 depicts a four cylinder arrangement with the crank shafts, relevant art and present embodiment superimposed.

Referring to FIG. 6, a four cylinder arrangement is shown with the crankshafts 600 of prior art and present embodiment superimposed. The dashed lines 601 are for the prior art crankshaft and the solid lines 602 are for the present embodiment crankshaft design as described for the system herein.

Figure 2:
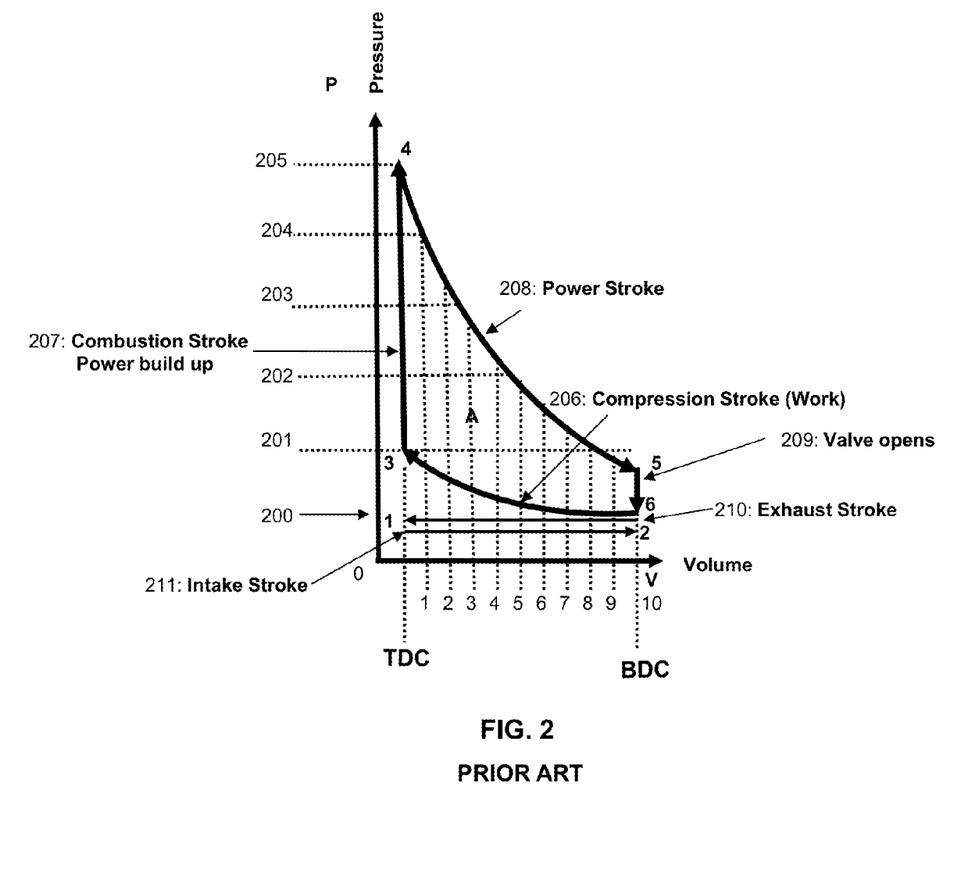
FIG. 2 depicts the PRESSURE VOLUME DIAGRAM of the Otto Cycle.

Referring next to FIG. 2, the Pressure/Volume diagram of relevant art for the Otto cycle is shown. The top of the cylinder travels from BDC to the TDC which is determined by the length of the crankpin. The pressure builds to the highest point 205 with combustion at TDC or around TDC depending on timing of the spark and the speed of gas burning and the revolutions of the Engine and other parameters such as heat and leakage of the piston rings and valves. It is obvious that the pressure decreases sharply with small amount of downward movement of the piston. This is why it is important to create large tangential force at the top portion of the downward motion of the piston. This will become evident with the description of FIG. 7.

Figure 7:
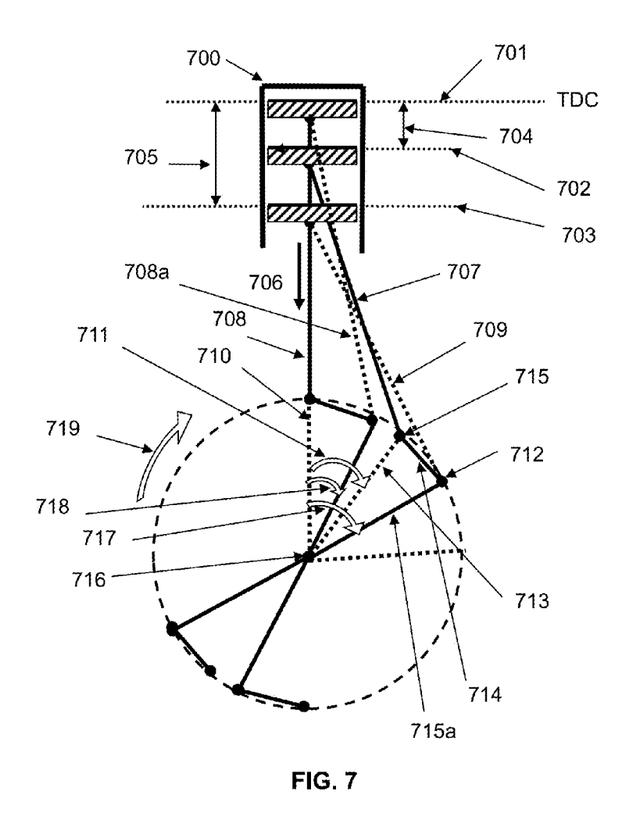
FIG. 7 depicts the angular relationships of the crankshafts and the crankpins of relevant art and present embodiment.

Before we proceed with FIG. 7 explanation it is important to review the basic principle of torque.

Torque is the result of a force being applied on an object at some distance from its axis of rotation. If torque acts over a period of time, the result is called power. In the case of automobile engines, the unit of power used is called horsepower. In the case of the four-stroke engine, the force of the igniting fuel, causing linear motion of the connecting rod, and converted to circular motion of the crankshaft, results in torque.

Referring to FIG. 7, the piston of cylinder 700 is at the TDC point 701. At this point, assuming that ignition and total combustion has occurred and the maximum pressure has been built, on a conventional crankshaft with crankpin 710 noted with dashed line, the downward pressure noted with arrow 706 and with connecting rod 708 in line with the crankpin 710, would try to push the crankpin through the bottom of the Engine. Reference will be made to the Engine Analysis Table noted above. At 0 (zero) degrees, the instant force at the top surface of the piston is shown to be 6283.1 pounds. At 10 degrees past TDC, the instant force is shown to be 5923.1 ponds. The loss is 362 pounds. If we assume that angle 718 is 10 degrees past TDC, the tangential force at the end of the crankpin will be calculated based on 5923.1 pounds. For the same angle of 10 degrees, the present embodiment crankpin will receive the TDC force of 6283.1 pounds. If the top of the piston at point 701 has traveled a distance 704 down to point 702, and the angle that the present embodiment crankpin axis has rotated and angle 711 of assumed to be 30 degrees, the force applied at the present embodiment crankpin at point 715 will be 4090.8 pounds. Because the connecting rod 707 and member 714 of the present embodiment crankpin form an approximate straight line to point 712, the force 4090.8 pounds will produce, approximately, the largest instantaneous torque to the crankshaft 716 axis. The calculations below are not completely accurate, but are rough approximations for explanatory purpose.

For a conventional crankpin at location 715a and with an angle 717 of approximately 60 degrees, the top of the piston would have traveled, from TDC, the distance 705 to position 703. The force applied at point 712 would be 2094.4 pounds. For a crankpin length of 1.75 inches or 0.146 feet, the torque generated would be Torque=2094.4×0.146=305 foot pounds. It is assumed that the connecting rod is at 90 degrees to the crankpin arm 715a for both calculations of torque. For the same assumption, the present embodiment crankpin would be acted upon with a force of 4090.8 pounds when the top of the piston is located at point 702 and with connecting rod 707 applied at point 715 of the present embodiment crankpin. The torque generated by the present embodiment crankpin at the 30 degree angle 711 would be torque=4090.8×0.146=597 foot pounds. The calculated toque for both cases is instantaneous. It can be proven in more detail that the present embodiment crankpin will always produce more torque than the relevant art counterpart crankpin throughout the productive rotation.

Integrating the torque produced by the present embodiment over the time of the power cycle, it can be shown that the horsepower of the engine of the present embodiment will be substantially greater than that of the relevant art four-cycle engine.

Figure 8A:
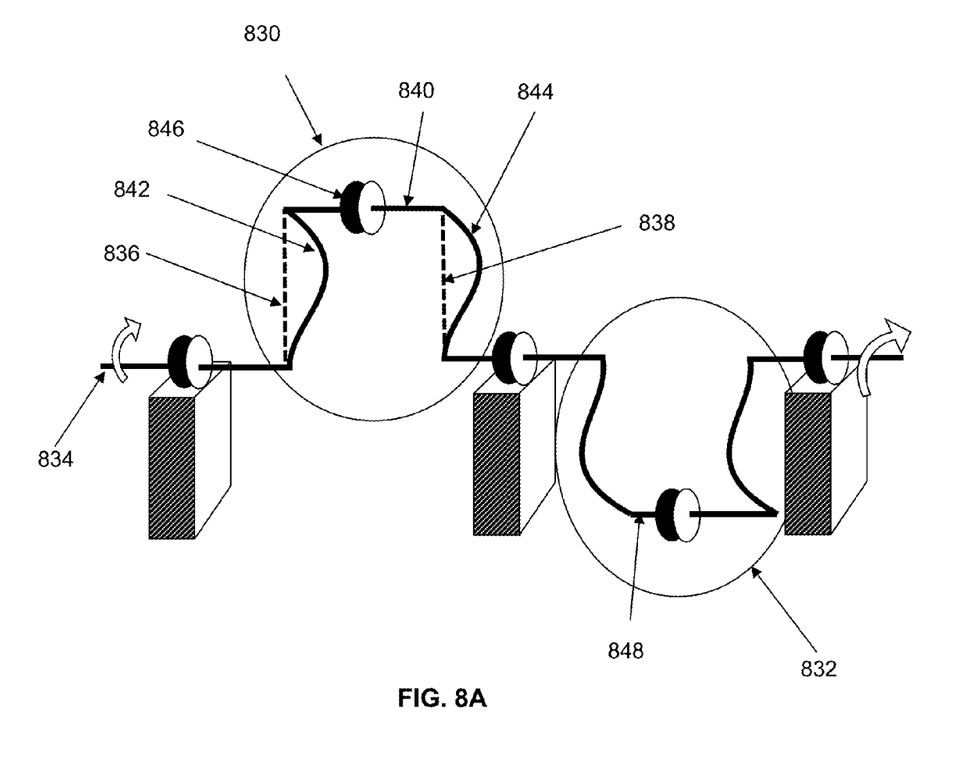
FIG. 8A depicts a front view of portions of a crankshaft and crankpins in accordance with an alternative embodiment of the invention.
Figure 8B:
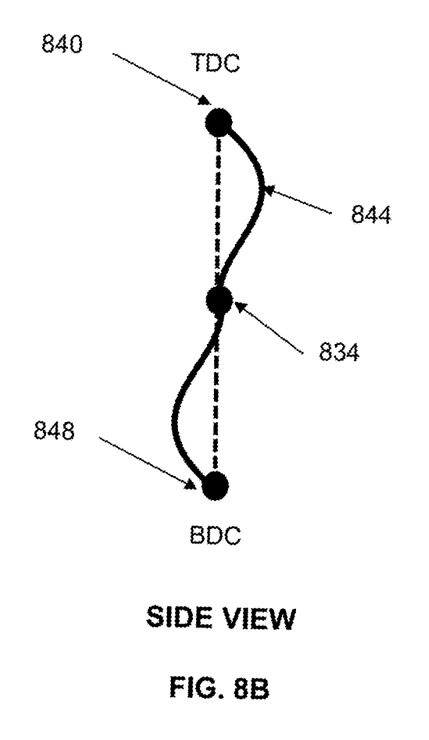
FIG. 8B depicts a side view of the FIG. 8A alternative embodiment.

While the present system has been described in detail and with reference to specific embodiments thereof, it will be apparent to one skilled in the art that various changes and modifications can be made therein without departing from the spirit and scope thereof. For example, in one or more non-limiting alternative embodiments of the invention, an alternative design can be substituted for the crankpins 501, 507, 508, 509 described above with reference to FIGS. 5 and 5A. FIGS. 8A and 8B show such an alternative design in frontal and side views, respectively. Here, crankpins 830 and 832 are shown along with a section of a crankshaft 834. In a manner similar to FIG. 5B, dashed lines 836 and 838 show the prior art crankpin design, while solid lines represent the present embodiment.

The crankpin 830 comprises a crankpin axis portion 840, a first main crankpin portion 842, and a second main crankpin portion 844. A distal end of the first main crankpin portion 842 is connected to a first end of the crankpin axis portion 840, while, in a similar manner, a distal end of the second main crankpin portion 844 is connected to a second end of the crankpin axis portion 840. A connecting rod that is pivotally coupled to a piston (both not specifically shown) is rotationally coupled to the crankpin axis portion 840 via a bearing 846. At the same time, a first portion of the crankshaft 834 is connected to a proximal end of the first main crankpin portion 842, while a second portion of the crankshaft 834 is connected to a proximal end of the second main crankpin portion 844. The crankpin 832 is similarly arranged to the crankpin 830, and, as a result, only its crankpin axis portion 848 is specifically labeled in the figures.

As was the case for the crankpins 501, 507, 508, 509, the first and second main crankpin portions 842, 844 in the present embodiment are adapted to generate greater torque at the crankshaft 834 than conventional crankpins. However, in the present embodiment, the main crankpin portions 842, 844 each act to connect the crankpin axis portion 840 to the crankshaft 834 without the use of multiple linear parts. Instead, the first and second main crankpin portions 842, 844 each define a respective curve along their lengths. These curves, in turn, act to place the majorities of the main crankpin portions 842, 844 outside a plane defined by the central longitudinal axis of the crankpin axis portion 840 and the axis of rotation of the crankshaft 834. The precise shapes of the main crankpin portions 842, 844 may be determined by, for example, maximizing the integral of torque of a power stroke of the piston. As before, the straight-line distance between the distal end of the first main crankpin portion 842 (where it connects to the crankpin axis portion 840) and the proximal end of the first main crankpin portion 842 (where it connects to the crankshaft 834) is substantially equal to one half of a maximum distance the piston is operative to travel in one direction.

Main crankpin portions with curved shapes in the manner of those shown in FIGS. 8A and 8B may impart several advantages to engines that incorporate such structures. They may, for example, be stronger than crankpins formed from connected, linear elements. In addition, curved main crankpin portions may be easier to manufacture and may therefore be more cost effective to implement. Lastly, the shapes of the curved main crankpin portions may allow even greater customization so as to achieve even greater engine performance.

In closing, it should be emphasized that all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:
1. An engine comprising:
    (i) a piston;
    (ii) a crankpin, the crankpin comprising:
        (a) a crankpin axis portion;
        (b) a first main crankpin portion, the first main crankpin portion comprising a distal end connected to a first end of the crankpin axis portion;
        (c) a second main crankpin portion, the second main crankpin portion comprising a distal end connected to a second end of the crankpin axis portion;
    (iii) a connecting rod, the connecting rod pivotally coupled to the piston, and rotationally coupled to the crankpin axis portion; and
    (iv) a crankshaft, the crankshaft comprising:
        (a) a first crankshaft portion, the first crankshaft portion connected to a proximal end of the first main crankpin portion;
        (b) a second crankshaft portion, the second crankshaft portion connected to a proximal end of the second main crankpin portion;
    wherein the first main crankpin portion follows a curved path between the first end of the crankpin axis portion and the first crankshaft portion;
    wherein the second main crankpin portion follows a curved path between the second end of the crankpin axis portion and the second crankshaft portion.
2. The engine of claim 1, wherein a central longitudinal axis of the crankpin axis portion and an axis of rotation of the crankshaft define a plane, and a majority of the first main crankpin portion lies outside the plane.

3. The engine of claim 1, wherein the first main crankpin portion is characterized by a varying radius of curvature along its length.

4. The engine of claim 1, wherein a straight-line distance between the distal end of the first main crankpin portion and the proximal end of the first main crankpin portion is substantially equal to one half of a maximum distance the piston is operative to travel in one direction.

5. The engine of claim 1, wherein the crankpin axis portion substantially describes a cylinder with a longitudinal axis substantially parallel to an axis of rotation of the crankshaft.

6. The engine of claim 1, wherein the second main crankpin portion is substantially a mirror image of the first main crankpin portion.

7. The engine of claim 1, wherein the connecting rod, the crankpin, and the crankshaft are collectively operative to translate reciprocating motion of the piston into rotational motion of the crankshaft.

\* \* \* \* \*